US010524143B2

(12) United States Patent
Muthuswamy

(10) Patent No.: US 10,524,143 B2
(45) Date of Patent: Dec. 31, 2019

(54) METHOD, SYSTEM, AND DEVICE FOR MANAGING NETWORK ENTRY AND BTS HANDOVER IN LAND-TO-SEA WIRELESS NETWORKS

(71) Applicant: WIPRO LIMITED, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/897,172

(22) Filed: Feb. 15, 2018

(65) Prior Publication Data
US 2019/0253947 A1    Aug. 15, 2019

(51) Int. Cl.
| | | |
|---|---|---|
| H04W 24/08 | (2009.01) | |
| H04W 36/30 | (2009.01) | |
| H04W 36/08 | (2009.01) | |
| H04W 36/36 | (2009.01) | |
| H04W 48/20 | (2009.01) | |
| H04W 76/10 | (2018.01) | |
| H04W 72/08 | (2009.01) | |

(Continued)

(52) U.S. Cl.
CPC ........... *H04W 24/08* (2013.01); *H04W 16/18* (2013.01); *H04W 36/08* (2013.01); *H04W 36/20* (2013.01); *H04W 36/30* (2013.01); *H04W 36/36* (2013.01); *H04W 48/20* (2013.01); *H04W 72/085* (2013.01); *H04W 72/1231* (2013.01); *H04W 76/10* (2018.02)

(58) Field of Classification Search
CPC ..... H04W 36/30; H04W 76/10; H04W 48/16; H04W 24/08; H04W 16/18; H04W 72/1231; H04W 72/085; H04W 36/08; H04W 36/20; H04W 36/36; H04W 48/20
See application file for complete search history.

(56) References Cited

U.S. PATENT DOCUMENTS 9,439,125 B2    9/2016  Eskicioglu et al.
2016/0135104 A1    5/2016  Lau et al.

OTHER PUBLICATIONS

Pseudo, Merriam-Webster. (online ed. https://www.merriam-webster.com/dictionary/pseudo). May 2019. (Year: 2019).*

(Continued)

*Primary Examiner* — Joshua Kading
(74) *Attorney, Agent, or Firm* — Finnegan, Henderson, Farabow, Garrett & Dunner, LLP

(57) ABSTRACT

A method, device, and system for managing network entry and handover in a land-to-sea wireless network. The method includes computing a downlink SNR metric associated with each of a plurality of antenna arrays of the CPE for each of a plurality of BTS frequencies. The method further includes computing a downlink AWSNR metric for each of the plurality of BTS frequencies across each of the plurality of antenna arrays. The method includes storing the downlink AWSNR metric computed for each of the plurality of BTS frequencies across each of the plurality of antenna arrays in a plurality of downlink AWSNR buffers. The method further includes assigning ranks to at least one downlink AWSNR buffer. The method includes establishing a pseudo-connection with a target BTS associated with a highest ranked downlink AWSNR buffer. The method further includes evaluating the pseudo-connection with the target BTS.

21 Claims, 8 Drawing Sheets

(51) Int. Cl.
    *H04W 16/18*     (2009.01)
    *H04W 72/12*     (2009.01)
    *H04W 36/20*     (2009.01)

(56) References Cited

OTHER PUBLICATIONS

Pseudo, Dictionary.com. (online ed. https://www.dictionary.com/browse/pseudo). May 2019. (Year: 2019).*

Automatic Frequency Selection—AFS, *aperto networks*, Sep. 19, 2011, pp. 1-2.

C. Veness, "Moveable Type Scripts: Calculate distance, bearing and more between Lattitude/Longitude points", 2002-2017, pp. 1-21.

* cited by examiner

METHOD, SYSTEM, AND DEVICE FOR MANAGING NETWORK ENTRY AND BTS HANDOVER IN LAND-TO-SEA WIRELESS NETWORKS

TECHNICAL FIELD

This disclosure relates generally to land-to-sea wireless networks and more particularly to method, system, and device for managing network entry and Base Transceiver Station (BTS) handover in the land-to-sea wireless networks.

BACKGROUND

In a long-range land-to-sea (LRLS) communication using variable-time-slot-TDMA (VTS-TDMA) in the 5 GHz unlicensed shared spectrum, which include a Base Transceiver Station (BTS) on land and Customer Premises Equipment (CPE) out in sea (on ships), communication end-points do not have any knowledge of interference at other end before connection is established. CPEs listen to broadcast Time Division Duplex (TDD) messages from a BTS on a given frequency and have the Signal to Noise Ratio (SNR) metric in a downlink. However, a BTS does not have a similar metric in an uplink before a connection is established to the CPE.

Further, interference is uncontrolled in unlicensed shared spectrum unlike in Long Term Evolution (LTE). Qualifying the interference before a network entry or a handover of the CPE is therefore important to sustain a connection and guarantee Service Level Agreement (SLA). Further, in selecting a potential BTS from a plurality of BTSs for the network entry or the handover, utilization of the BTS needs to be factored into a decision to maximize throughput for the CPE after connection establishment. This is critical in a Time Division Multiple Access (TDMA) system.

In the LRLS communication, when uplink interference is not evaluated and used in a decision metric to establish the network entry or the handover, there is an SLA maintenance issue at the CPE, if the throughput drops below 3 MBPS or the LRLS connection times out and link drops. Network communication in the uplink (TCP ACKs) will be limited by this interference, which will cause a throughput drop in the downlink or TDD timeouts in the uplink leading to link tear down. In such a scenario, there is a need to switch data-path to Very Small Aperture Terminal (VSAT) network to maintain the SLA. When channel conditions improve, data-path may switch back to LRLS network (from VSAT). This switching back and forth of data-paths, between LRLS and VSAT channels is likely to get into unnecessary "flapping" (ping-pong) effect. Such switching back and forth affects overall Quality of Experience (QoE). Since the LRLS operates in a shared spectrum, the channel quality becomes unpredictable based on usage of the shared spectrum by other entities. This may aggravate the flapping issue post switching of the channel from VSAT to LRLS under unfavorable conditions of the LRLS channel.

In some conventional systems, handovers are performed based on quality metrics such as signal strength or some measure of it or based on distance of a CPE from BTS. Also, in some conventional systems, for network entry, Automatic frequency selection (AFS) mechanism and link drop under interference are used. However, these conventional systems have the following limitations: handover decisions do not consider interference in the uplink and the downlink, distance of the CPE from a BTS is a hard to quantify metric in interference limited (5 GHz shared spectrum) TDMA based systems, AFS mechanisms do not guarantee SLA under interference, and no conclusive solution to mitigate ping-pong effect.

SUMMARY

In one embodiment, a method of managing network entry and handover in a land-to-sea wireless network is disclosed. The method includes computing, by a Customer Premises Equipment (CPE), a downlink Signal-to-Noise Ratio (SNR) metric associated with each of a plurality of antenna arrays of the CPE for each of a plurality of Base Transceiver Station (BTS) frequencies, based on a plurality of Time Division Duplex (TDD) messages collected for the plurality of BTS frequencies. The method further includes computing, by the CPE, a downlink Aggregated Weighted SNR (AWSNR) metric for each of the plurality of BTS frequencies across each of the plurality of antenna arrays based on downlink SNR metrics associated with the plurality of antenna arrays. The method includes storing, by the CPE, the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array. The method further includes assigning ranks, by the CPE, to at least one downlink AWSNR buffer from the plurality of downlink AWSNR buffers based on associated downlink AWSNR metrics. The method includes establishing, by the CPE, a pseudo-connection with a target BTS associated with a highest ranked downlink AWSNR buffer. The method further includes evaluating, by the CPE, the pseudo-connection with the target BTS for one of a network entry and a handover, based on at least one of uplink AWSNR metrics associated with the target BTS or Module and Coding Scheme (MCS) metrics associated with the CPE and the target BTS.

In another embodiment, a CPE for managing network entry and handover in a land-to-sea wireless network is disclosed. The CPE includes a plurality of antenna arrays, a processor coupled to the plurality of antenna arrays, and a memory communicatively coupled to the processor and the plurality of antenna arrays, wherein the memory stores instructions, which on execution cause the processor to compute a downlink SNR metric associated with each of the plurality of antenna arrays of the CPE for each of a plurality of BTS frequencies, based on a plurality of TDD messages collected for the plurality of BTS frequencies. The processor instructions further cause the processor to compute a downlink AWSNR metric for each of the plurality of BTS frequencies across each of the plurality of antenna arrays based on downlink SNR metrics associated with the plurality of antenna arrays. The processor instructions cause the processor to store the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array. The processor instructions further cause the processor to assign ranks to at least one downlink AWSNR buffer from the plurality of downlink AWSNR buffers based on associated downlink AWSNR metrics. The processor instructions cause the processor to establish a pseudo-connection with a target BTS associated with a highest ranked downlink AWSNR buffer. The processor instructions further cause the processor to evaluate the pseudo-connection with the target BTS for one of a network entry and a handover, based on at least one of uplink AWSNR metrics associated with the target BTS or MCS metrics associated with the CPE and the target BTS.

In yet another embodiment, a system for managing network entry and handover in a land-to-sea wireless network is disclosed. The system includes a plurality of BTSs and a CPE configured to communicate with at least one of the plurality of BTSs. The CPE is further configured to compute a downlink SNR metric associated with each of the plurality of antenna arrays of the CPE for each of a plurality of BTS frequencies associated with the plurality of BTSs, based on a plurality of TDD messages collected for the plurality of BTS frequencies. The CPE is configured to compute a downlink AWSNR metric for each of the plurality of BTS frequencies across each of the plurality of antenna arrays based on downlink SNR metrics associated with the plurality of antenna arrays. The CPE is further configured to store the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array. The CPE is configured to assign ranks to at least one downlink AWSNR buffer from the plurality of downlink AWSNR buffers based on associated downlink AWSNR metrics. The CPE is further configured to establish a pseudo-connection with a target BTS associated with a highest ranked downlink AWSNR buffer. The CPE is configured to evaluate the pseudo-connection with the target BTS for one of a network entry and a handover, based on at least one of uplink AWSNR metrics associated with the target BTS or MCS metrics associated with the CPE and the target BTS.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
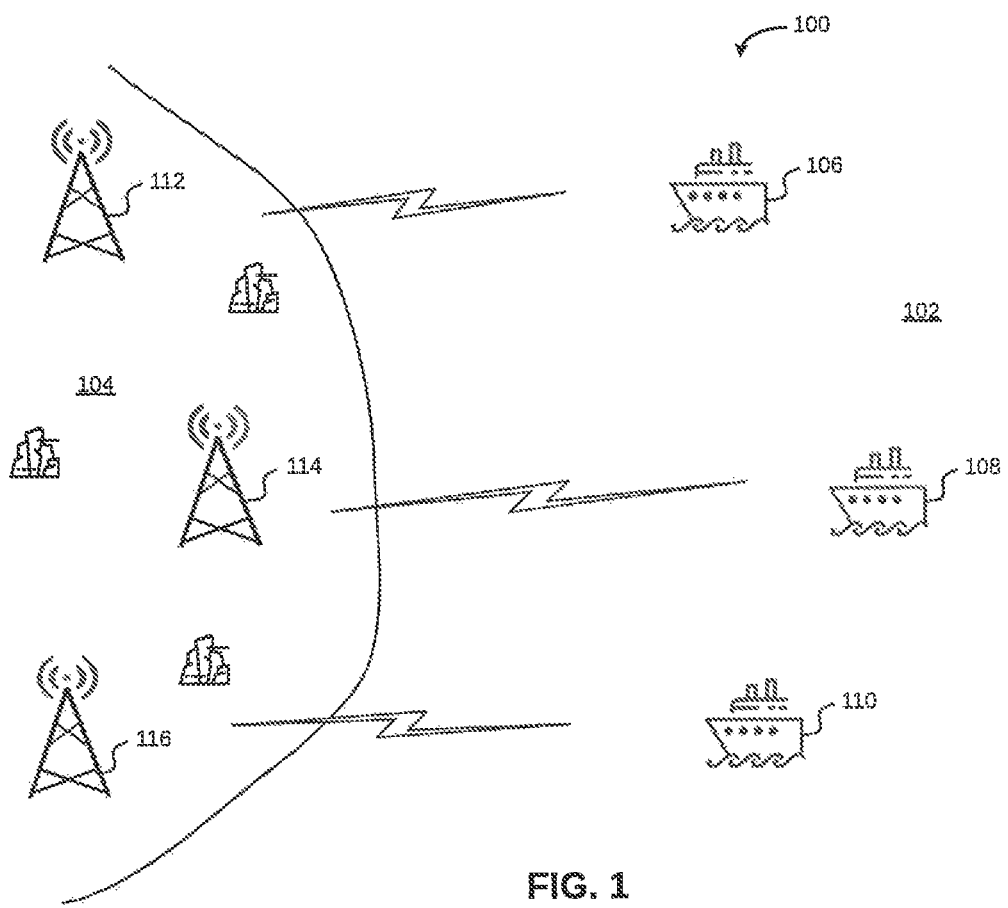
FIG. 1 is a block diagram illustrating an environment in which various embodiment may be employed.

Additional illustrative embodiments are listed below. In one embodiment, an environment 100 (that is exemplary) in which various embodiments may be employed is illustrated in FIG. 1. Environment 100 includes a water body 102 and a land 104. Water body 102, for example, may be a sea or an ocean and land 104, for example, may include coastal areas or islands. A plurality of watercrafts, for example, a ship 106, a ship 108, and a ship 110, while navigating in water body 102, may be in communication with one or more Base Transceiver Stations (BTSs), for example, a BTS 112, a BTS 114, and a BTS 116 on land 104. It will be apparent to a person skilled in the art that a watercraft, for example, may include, but is not limited to a boat, a submarine, a hovercraft, and a seaplane.

Each of the plurality of watercrafts may include a Customer Premises Equipment (CPE) or a mobile station that establishes communication with one or more BTSs. In other words, in order to provide communication service within a watercraft, the CPE installed on the watercraft establishes communication with a BTS. By way of an example, a CPE in ship 106 establishes communication with BTS 112, a CPE in ship 108 establishes communication with BTS 114, and a CPE in ship 110 establishes communication with BTS 116. The communication may be established using a long-range land-to-sea wireless communication link using Variable-Time-Slot-TDMA (VTS-TDMA) in the 5 Gigahertz (GHz) unlicensed shared spectrum.

Figure 2:
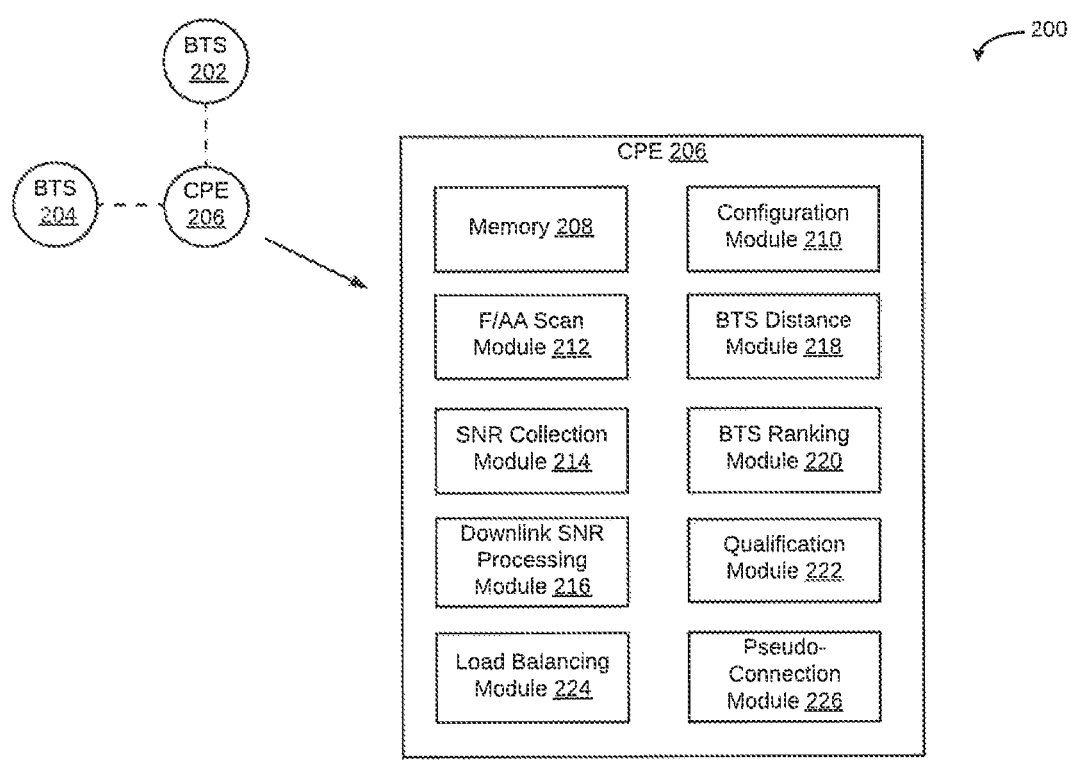
FIG. 2 is a block diagram illustrating a system for managing network entry and handover of a Customer Premises Equipment (CPE) in a land-to-sea wireless network, in accordance with an embodiment.

Referring now to FIG. 2, a block diagram of a system 200 for managing network entry and handover in a land-to-sea wireless network is illustrated, in accordance with an embodiment. The land-to-sea wireless network may operate using VTS-TDMA in the 5 GHz unlicensed shared spectrum. System 200 includes a BTS 202, a BTS 204, and a CPE 206. In an embodiment, BTS 202 may be the serving BTS for CPE 206, thus CPE 206 may be in communication with BTS 202. In this case, CPE 206 may switch service to BTS 204, which may be a target BTS for handover. In another embodiment, CPE 206 may not be currently connected to any BTS in the land-to-sea wireless network. In this case, both BTS 202 and BTS 204 would be a target BTS for CPE 206 to connect to. CPE 206 may include a plurality of antenna arrays that may be used to communicate with one or more of BTS 202 and BTS 204.

At initiation, a plurality of configuration parameters are stored in a memory 208 of CPE 206. Memory 208 may be a flash chip installed in CPE 206. CPE 206 further includes a configuration module 210, which is a functional unit that reads the plurality of configuration parameters from memory 208 and loads it into the main memory (for example, Random Access Memory (RAM)) (not shown in FIG. 2), for other modules in CPE 206. In an embodiment, whenever CPE 206 is power cycled or rebooted, configuration module 210 reads the plurality of configuration parameters from memory 208. The plurality of configuration parameters are explained in detail in conjunction with FIGS. 4A and 4B.

CPE 206 further includes a Frequency and Antenna Array (F/AA) Scan Module 212, which periodically scans each of the plurality of antenna arrays for each of a plurality of BTS frequencies programmed in a scan table of CPE 206. F/AA scan module 212 collects a plurality of TDD messages for the plurality of BTS frequencies by scanning each of the plurality of BTS frequencies. Based on the plurality of TDD messages, an SNR collection module 214 computes a downlink SNR metric associated with each of the plurality of antenna arrays for each of the plurality of BTS frequencies. Thereafter, a downlink SNR processing module 216 computes a downlink AWSNR metric for each of the plurality of BTS frequencies across each of the plurality of antenna arrays using downlink SNR metrics associated with the plurality of antenna arrays. Downlink SNR processing module 216 then stores the downlink AWSNR metric computed for each of the plurality of BTS frequencies associated with the one or more BTSs across each of the plurality of antenna arrays in a plurality of downlink AWSNR buffers. This is further explained in detail in conjunction with FIG. 3.

A BTS distance module 218 may then compute a distance between CPE 206 and each BTS associated with each of the plurality of BTS frequencies. BTS distance module 218 then checks whether the distance between CPE 206 and each BTS is greater than a distance threshold. This is further explained in detail in conjunction with FIGS. 4A and 4B.

Thereafter, a BTS ranking module 220 assigns ranks to each of the one or more downlink AWSNR buffers based on associated downlink AWSNR metrics. In other words, a BTS associated with a downlink AWSNR buffer is assigned a rank. Once ranks are assigned to the one or more downlink AWSNR buffers, a qualification module 222 qualifies one or more downlink AWSNR buffers, which have been assigned ranks, for a pseudo-connection to an associated target BTS. This is further explained in detail in conjunction with FIGS. 4A and 4B. In an embodiment, before establishing a pseudo-connection, a load balancing module 224 selects a BTS associated with one of the plurality of BTS frequencies as the target BTS, based on comparison of downlink throughput predicted for the CPE with a threshold downlink throughput. This is further explained in detail in conjunction with FIGS. 4A and 4B.

A pseudo-connection module 226 then establishes a pseudo-connection with a target BTS associated with a highest ranked downlink AWSNR buffer selected from amongst downlink AWSNR buffers qualified for pseudo-connections. Once the pseudo-connection is established with the target BTS, pseudo-connection module 226 evaluates the pseudo-connection with the target BTS for one of a network entry and a handover. This is further explained in detail in conjunction with FIG. 3.

Figure 3:
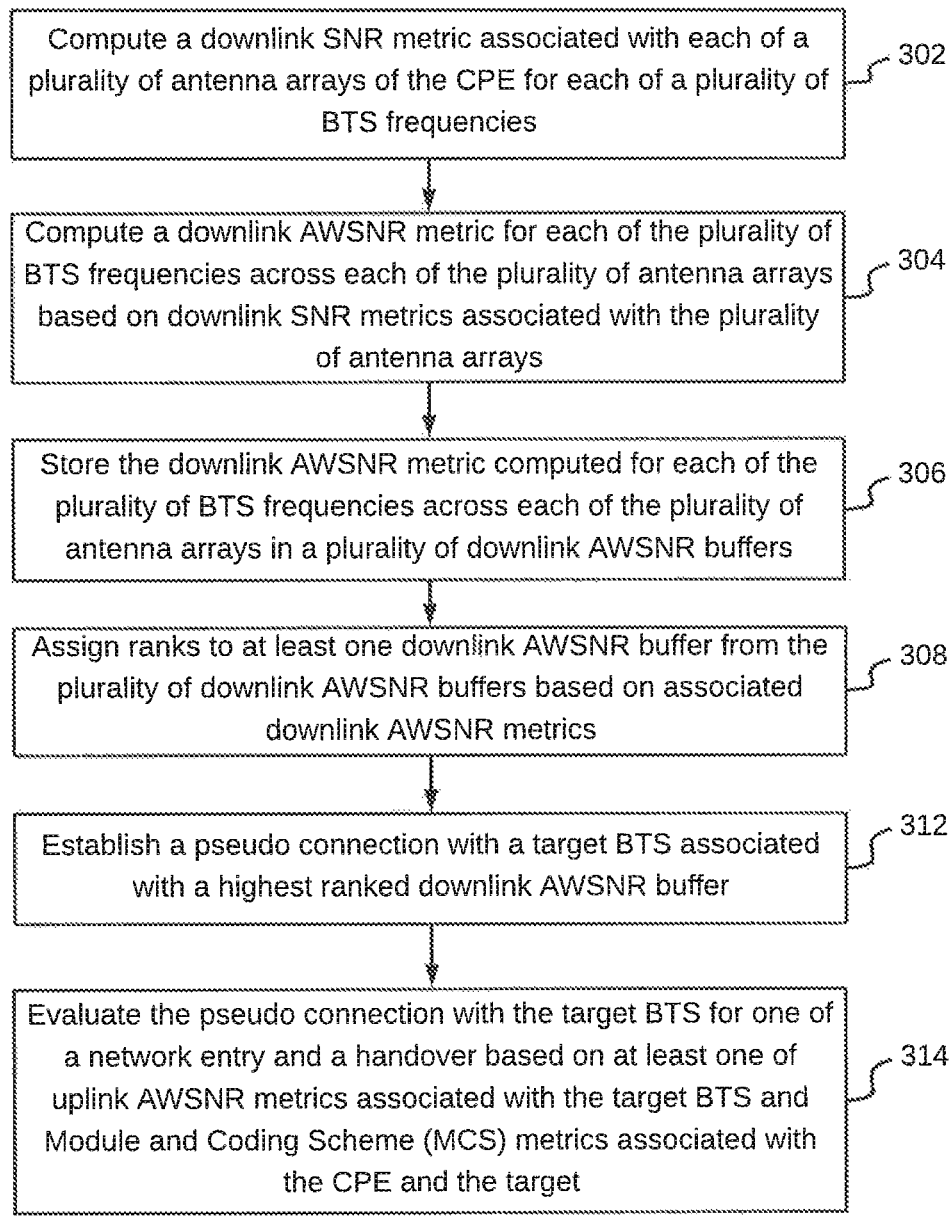
FIG. 3 illustrates a flowchart of a method of managing network entry and handover in a CPE land-to-sea wireless network, in accordance with an embodiment.

Referring now to FIG. 3, a flowchart of a method of managing network entry and handover of a CPE in a land-to-sea wireless network is illustrated, in accordance with an embodiment. The CPE may initially be configured to store a plurality of configuration parameters. The plurality of configuration parameters may be stored within a memory of the CPE. The configuration parameters are explained in detail in conjunction with FIGS. 4A and 4B. In an embodiment, the plurality of configuration parameters may be pre-stored in the CPE. In an alternate embodiment, the plurality of configuration parameters may be stored in the CPE, when the CPE enters the land-to-sea wireless network.

The plurality of configuration parameters may also be stored in each of the plurality of BTSs in the land-to-sea wireless network.

The CPE may include a scan table that is programmed with a plurality of BTS frequencies. By way of an example, the total number of BTS frequencies that the CPE is programmed to scan may be 'F,' such that, $2 \leq F \leq 6$. In this case the BTS frequencies may be enumerated as f1=0, f2=1, f3=2, f4=3, f5=4, and f6=5. A plurality of antenna arrays of the CPE scan each of the plurality of BTS frequencies to collect and read a plurality of Time Division Duplex (TDD) messages broadcasted on the plurality of BTS frequencies. In other words, each antenna array of the CPE would collect TDD messages broadcasted on each of the plurality of BTS frequencies. The CPE may periodically scan each of the plurality of BTS frequencies, for example, after every Ts seconds, on each of the plurality of antenna arrays (for example, N antenna-arrays $4 \leq N \leq 16$) looking for TDD messages for BTSs associated with the plurality of BTS frequencies.

For an unconnected CPE, i.e., for a network entry scenario, the CPE dwells on each antenna array for a fixed time duration (for example, $T_a$ millisecond) and on each BTS frequency on that antenna array for a fixed time duration (for example, $T_f$ millisecond) to collect the TDD messages. Thus, in the network entry scenario, $T_a = F*T_f$. Similarly, for a connected CPE, i.e., for a handover scenario, the CPE periodically scans the plurality of BTS frequencies to look for a target BTS that may provide superior service (throughput) than the serving BTS. The CPE sends a TDD message flag to the serving BTS indicating that the CPE intends to scan other BTS frequencies and accordingly the CPE disables its uplink and downlink data-path. In a similar manner, when the serving BTS detects the TDD message flag set, the serving BTS also disables its uplink and downlink data-path. Thereafter, the CPE dwells on each antenna array (excluding the antenna array, which may be termed as AA0) that is being currently used to communicate with the serving BTS) for a predefined time period, which may be equal to $(T_a - T_f)$ millisecond. The CPE scans each frequency other than the BTS frequency of the serving BTS for a period of $T_f$ millisecond to collect downlink TDD messages broadcasted on each of the plurality of BTS frequencies. After the CPE has scanned all the target BTS frequencies on the current antenna array, i.e., AA-x, of the CPE, the CPE switches to the antenna array that is being used to communicate with the serving BTS, i.e., AA-0. Once the CPE switches to the serving antenna array, i.e., AA-0, the CPE signals end of frequency scan to the serving BTS by unsetting the TDD message flag and thereafter enables uplink and downlink data-path. Once the serving BTS detects that the TDD message flag has been unset, the serving BTS enables its uplink and downlink data-path as well. In the next scan interval, the CPE switches to the next antenna array, i.e., AA-(x+1), of the CPE and repeats the frequency scan procedure described above to collect TDD messages from. This process is repeated until each antenna array of the CPE has been used to scan each of the plurality of frequencies, except, the serving BTS frequency.

Based on a plurality of TDD messages collected for the plurality of BTS frequencies, the CPE, at step 302, computes a downlink Signal-to-Noise Ratio (SNR) metric associated with each of the plurality of antenna arrays of the CPE for each of the plurality of BTS frequencies. For an unconnected CPE, i.e., for the network entry scenario, the CPE computes a downlink SNR metric for each antenna array of the CPE based on the TDD messages collected by each antenna array.

In other words, in order to compute a downlink SNR metric associated with a given antenna array for a particular BTS frequency, TDD messages collected by that antenna array broadcasted on that particular BTS frequency are used. This is repeated for each combination of an antenna array and each of the plurality of antenna arrays. By way of an example, if there are four antenna arrays and three BTS frequencies, there will be a total to twelve SNR metrics. In an exemplary embodiment, the SNR metric for an antenna array and a BTS frequency may be computed using the equation 1 given below:

$$SNR\ metric = RSSI - NF \quad (1)$$

where,
RSSI is the received signal strength indicator computed by the CPE from received packets (the TTD messages collected in this case) for the BTS frequency by the antenna array;
NF is the noise floor computed by the CPE from received packets (the TTD messages collected in this case) for the BTS frequency by the antenna array The SNR metrics computed for each antenna array per BTS frequency may be stored in buffers in a main memory of the CPE. By way of an example, the CPE may include four antenna arrays with 4 antenna elements per antenna array, in this case SNR metrics for these four antenna elements for a given antenna array may be represented and stored as: S1, S2, S3, and S4. Thus, the SNR metrics for a given BTS frequency is for a given antenna array, and each SNR number is for an antenna element within the antenna array.

Similarly, for a connected CPE, i.e., for the handover scenario, the CPE first computes SNR metrics for the BTS frequency of the serving BTS across each of the plurality of antenna arrays and stored them in buffers in the main memory. Thereafter, the CPE computes SNR metrics for each target BTS frequency associated with one or more target BTSs across each of the plurality of antenna arrays. The CPE then merges the SNR metrics computed for each target frequency across the plurality of antenna arrays with SNR metrics computed for the serving BTS frequency across the plurality of antenna arrays in the buffer.

Based on downlink SNR metrics associated with the plurality of antenna arrays, the CPE, at step 304, computes a downlink Aggregated Weighted SNR (AWSNR) metric for each of the plurality of BTS frequencies across each of the plurality of antenna arrays. In other words, one AWSNR metric will be computed for a given BTS frequency on each antenna array of CPE. In an exemplary embodiment, AWSNR may be computed for a BTS frequency using the equation 2 given below:

$$AWSNR = \Sigma Sn \quad (2)$$

Where,
$Sn = W1 \ast Sn$, when $Sn > a$ SNR threshold (S) for weight assignment, else $Sn = W2 \ast Sn$,
Sn is an SNR metric for a BTS frequency on an antenna array,
n is the total number of antenna arrays in the CPE.

At step 306, the CPE stores the downlink AWSNR metric computed for each of the plurality of BTS frequencies across each of the plurality of antenna arrays in a plurality of downlink AWSNR buffers. The downlink AWSNR metrics are stored, such that, each of the plurality of downlink AWSNR buffers is indexed by an associated BTS frequency and an associated antenna array. In an embodiment, downlink AWSNR metrics may be stored in a circular buffer of size M, which is configurable and is indexed by an associated BTS frequency and an associated antenna array.

Once the downlink AWSNR buffers are stored as in the plurality of downlink buffers, the CPE, at step 308, assigns ranks to one or more of the downlink AWSNR buffers from the plurality of downlink AWSNR buffers based on associated downlink AWSNR metrics. The method used to assign ranks to one or more downlink AWSNR buffers may differ based on whether the CPE is an unconnected CPE, i.e., in a network entry scenario, or whether the CPE is a connected CPE, i.e., in a handover scenario. The method of assigning ranks for the network entry scenario is described in detail in conjunction with FIGS. 4A, 4B, and 5, and for the handover scenario is described in detail in conjunction with FIGS. 4A, 4B, and 6.

Based on the assigned ranks, the CPE, at step 310, establishes a pseudo-connection with a target BTS that is associated with a highest ranked downlink AWSNR buffer. In an embodiment, before the CPE establishes a pseudo-connection with the target BTS, the CPE may qualify one or more downlink AWSNR buffers associated with each of the plurality of BTSs for a pseudo-connection to associated target BTS. This is further explained in detail in conjunction with FIGS. 4A and 4B. When the pseudo-connection is established, the data-path will be disabled on both the uplink and downlink for the CPE and the target BTS under evaluation. Further, the pseudo-connection may be established in two modes, i.e., SNR based fast BTS acquisition mode or Module and Coding Scheme (MCS) based slow BTS acquisition mode.

Once the pseudo-connection is established, the CPE, at step 312, evaluates the pseudo-connection with the target BTS for the network entry scenario and the handover scenario. In an embodiment, the pseudo-connection may be evaluated based on uplink AWSNR metrics associated with the target BTS. In another embodiment, the pseudo-connection may be evaluated based on MCS metrics associated with the CPE and the target BTS.

In the embodiment, where uplink AWSNR metrics associated with the target BTS is used to evaluate the established pseudo-connection, the target BTS computes uplink SNR metrics based on the equation 1 given above and thereafter, based on appropriate configurations for network entry or handover, the target BTS computes uplink AWSNR metrics for the target BTS based on the equation 2. The target BTS then stores the uplink AWSNR metrics in a circular buffer in a main memory of the target BTS. In an exemplary embodiment, the BTS frequency associated with the target BTS may be $f_2$ and the third antenna array, i.e., AA-3. The uplink AWSNR buffer is thus indexed by ($f_2$, AA-3). The uplink AWSNR metrics is depicted in table 1 given below, which is used for qualification of the uplink for the network entry scenario or the handover scenario.

TABLE 1

| F, AA | Uplink AWSNR Metrics | | | | | | | | | | CP |
|---|---|---|---|---|---|---|---|---|---|---|---|
| $f_2$, AA-3 | 66 | 57 | 69 | 52 | 61 | 63 | 62 | 58 | 61 | 65 | 90% |

For the table 1 above, the following configurations are assumed. The circular buffer size, i.e., M is equal to 10; uplink AWSNR for network entry or handover threshold, i.e., E, is equal to 24 dB, and confidence percentage threshold for uplink AWSNR metrics, i.e., P, is equal to 50%. In table 1, 90% of uplink AWSNR metrics are above the value of E, i.e., 24 dB and this percentage is greater than the value of P, i.e., 50%. When a network entry event is detected on the uplink, the target BTS may send a notification in a TDD message to the CPE to move to the connected mode, following which, the target BTS and the CPE will both enable the data-path on the uplink and the downlink. If the uplink is not qualified for a network entry (or a handover), the target BTS may send a notification to CPE to proceed with the evaluation of the next highest ranked BTS. Uplink link qualification is essential to avoid ping-pong effects on network entry or after a handover.

Further, in the embodiment where uplink MCS metrics associated with the CPE and the target BTS are used to evaluate the established pseudo-connection, link adaptation to determine the best uplink and downlink MCS may be used. MCS may be indexed into a throughput table, which may be the rate r(d) at range d. The target BTS may send a utilization metric for the target BTS and a downlink MCS in a Media Access Control (MAC) Protocol Data Unit (PDU) to the CPE. In an embodiment, the CPE may maintain three buffers of a predefined size (which may be configurable) for each target BTS. Two of these three buffers one buffer is for uplink MCS, the second buffer is for downlink MCS, and the third buffer is for target BTS utilization information. In an exemplary embodiment, MCS buffers for two target BTSs that have the highest and the second highest rank respectively, are depicted in table 4 give below. The MCS table is depicted in table 2 and the MCS throughput (in mbps) table is depicted in table 3 given below:

TABLE 2

| SS1 | 0  | 1  | 2  | 3  | 4  | 5  | 6  | 7  |
|-----|----|----|----|----|----|----|----|----|
| SS2 | 8  | 9  | 10 | 11 | 12 | 13 | 14 | 15 |
| SS3 | 16 | 17 | 18 | 19 | 20 | 21 | 22 | 23 |
| SS4 | 24 | 25 | 26 | 27 | 28 | 29 | 30 | 31 |

TABLE 3

| SS1 | 4.4  | 8.5  | 12.1 | 16.0 | 24.0 | 29.9 | 33.3 | 35.9 |
|-----|------|------|------|------|------|------|------|------|
| SS2 | 8.4  | 16.1 | 23.3 | 30.8 | 43.5 | 55.3 | 59.1 | 62.2 |
| SS3 | 12.4 | 24.3 | 35.3 | 44.8 | 61.5 | 71.2 | 74.2 | 76.5 |
| SS4 | 16.2 | 31.4 | 44.7 | 57.8 | 71.0 | 78.9 | 80.6 | 80.6 |

In table 2 and 3, SSn is the spatial stream and the value of n may range from 1 to 4. By way of an example, for the table 2 and 3, in SS1, the MCS 0 has a throughout of 4.4 mbps and in SS3 the throughput for the MCS 18 has a throughput of 35.3. The table 4 also depicts MCS metrics collected by the CPE from the two target BTSs for network entry of the CPE:

TABLE 4

| DL MCS Throughput (Mbps) | | UL MCS Throughput (Mbps) | | BTS Utilization (U) | |
|---|---|---|---|---|---|
| BTS1 | BTS2 | BTS1 | BTS2 | BTS1 | BTS2 |
| 44.8 (19) | 30.8 (11) | 31.4 (25) | 16.1 (9)  | 3.0T | 1.1T |
| 61.5 (20) | 30.8 (11) | 44.7 (26) | 23.3 (10) | 2.6T | 1.0T |
| 43.5 (12) | 35.3 (18) | 35.3 (18) | 31.4 (25) | 2.0T | 1.1T |
| 44.7 (26) | 31.4 (25) | 31.4 (25) | 16.2 (24) | 2.9T | 1.3T |
| 57.8 (27) | 43.5 (12) | 30.8 (11) | 24.3 (17) | 3.2T | 1.1T |

In table 4 above, by way of an example, in the column for DL MCS throughout, for BTS1, 44.8 (19) depicts that in downlink for BTS1, throughput at MCS 19 is 44.8. For all the tables 2, 3, and 4, the following assumptions are made. The number of circular buffers of a predefined size (M) are 5, the number of CPEs on BTS1(f2, 3) are 4, the number of CPEs on BTS2 (f1, 1) are 2, MCS throughput threshold for data-path enable, i.e., L2, is 20 mbps, Confidence percentage on MCS throughput for data-path enable, i.e., P2, is 50%, minimum Service Level Agreement (SLA) requirement, i.e., L3 is 3 mbps, and confidence percentage on minimum SLA requirement, i.e., P3, is 90%.

Based on the assumptions above, in table 4, for BTS1, 100% of the MCS throughput samples in the uplink are greater than the value of L2, i.e., 20 Mbps. Similarly, for BTS2, 60% of the MCS throughput samples in the uplink are greater than the value of L2, i.e., 20 Mbps. These percentages are greater than the value of P2, i.e., 50%. Therefore, network entry of the CPE is qualified in the uplink for BTS1 and BTS2. Uplink link qualification is essential to avoid ping-pong effects on network entry or handover.

Thereafter, predicted maximum throughput for the CPE in the downlink is computed for the BTS1 and the BTS2 using equation 3 given below:

$$C = r(d)/(1+U/T) \quad (3)$$

where,
C is the predicted maximum throughput for a CPE in the downlink,
r(d) is the maximum rate (throughput) that can be achieved at the CPE at a distance of d from the BTS. For example, in table 5, the first value for BTS1 is computed using equation (3) and table 4 as C=44.8/(1+3)=11.2. Similarly, other values are computed,
d is the distance of the CPE from a target BTS,
U is the downlink utilization of the target BTS,
T is the time allotted by the target BTS to the CPE.

The predicted maximum throughput for CPE in the downlink, when the CPE is to make a network entry on BTS1 or BTS2 is depicted in table 5 given below:

TABLE 5

| BTS  | C = r(d)/(1 + U/T) | | | | | CP  |
|------|------|------|------|------|------|-----|
| BTS1 | 11.2 | *17.1* | 14.5 | *19.4* | 13.8 | 40% |
| BTS2 | *14.7* | 15.4 | *16.8* | 13.6 | *20.7* | 60% |

In the table 5 above, 100% of the samples are greater than L3 having a value of 3 Mbps and the percentage is greater than P3 having a value of 90%. In a similar manner, the equation 4 given below is used to compute the best predicted maximum throughput sample across BTS1 and BTS2 are evaluated for each sample. For example, the first value across BTSs is C=max (11.2, 14.7)=14.7, the second value is C=max (17.1, 15.4)=17.1 and so on. These samples have been italicized in the table 5.

$$C = \max(Cj) \quad (4)$$

where,
Cj is the predicted maximum throughput for the CPE in the downlink for BTSj, and
max (Cj) is the maximum value of predicted capacity across all BTSs.

Referring back to table 5, in 60% of the cases, the BTS2 may provide a better throughput to the CPE, when compared with BTS1. As a result, the CPE will pick BTS2 for network entry and move the state to "connected" from "pseudo-connected" by signaling the BTS2 in a TDD message flag. Thereafter, the CPE and the BTS2 enable the data-path on both the uplink and downlink on their respective communication end-points to complete the network entry.

If the CPE was considering a handover (assuming that the CPE is currently connected to the BTS1, which is the serving BTS for the CPE), all procedures and steps described above for the network entry scenario remain the same for the handover as well, except for the uplink and downlink MCS throughput buffers and BTS utilization, which are obtained from the BTS1 in the connected state. Further, when a target BTS selected for the handover is not the serving BTS, i.e., the BTS1, then additional qualification on the target buffer for predicted maximum throughput is enforced using equation 5 given below.

$$Ct=\max(Cj) \text{ and } (Ct-C)>\Delta>0 \qquad (5)$$

where,

Ct is the predicted maximum throughput for the CPE in the downlink for a target BTSt for handover, C is the predicted maximum throughput for the CPE in the downlink for the serving BTS, $\Delta$ (or RT) is the throughput handover hysteresis threshold.

For a handover of the CPE, a throughput handover hysteresis enforcement is depicted by way of table 6 given below:

TABLE 6

| BTS | C = r(d)/(1 + (U/T)) | | | | CP |
|---|---|---|---|---|---|
| BTS1 | 15.6 | 16.7 | 15.9 | 18.1 | 19.5 | |
| BTS2 | 21.9 | 20.4 | 22.8 | 23.6 | 25.7 | 80% |

In the table 6 above, following assumptions are made: the number of circular buffer of a predefined size (i.e., M) are equal to 5, the throughput handover hysteresis threshold, i.e., RT, is equal to 5 Mbps, confidence percentage on throughput handover hysteresis, i.e., P4 is equal to 75%. Referring back to table 6, 80% of the samples for the BTS2 (the target BTS) are greater than the samples for the BTS1 (the serving BTS) by the value of RT, i.e., 5 Mbps. This percentage is greater than the confidence percentage on throughput HO hysteresis, i.e., P4, having a value of 75%. Therefore, the BTS2 is selected for handover of the CPE. To this end, the CPE signals the BTS2 to confirm the handover in a TTD message flag. Thereafter, both the BTS2 and the CPE move their connection state to "connected" from "pseudo-connected" and enable the data-path on both uplink and downlink at their respective communication end-points. The CPE then breaks its existing connection with the BTS1, in order to complete the handover.

Figure 4A:
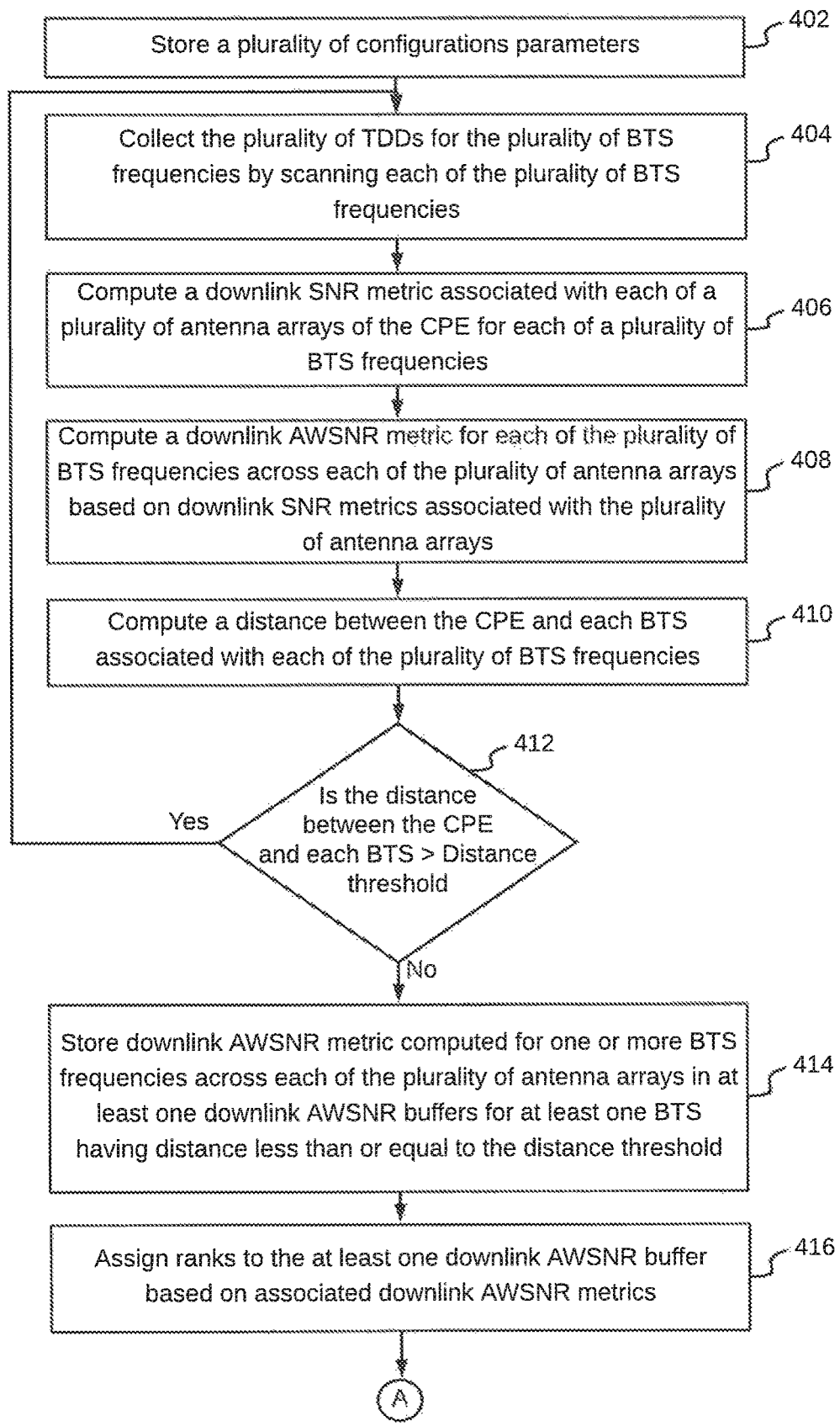
FIGS. 4A and 4B illustrate a flowchart of a method of managing network entry and handover in a land-to-sea wireless network, in accordance with another embodiment.
Figure 4B:
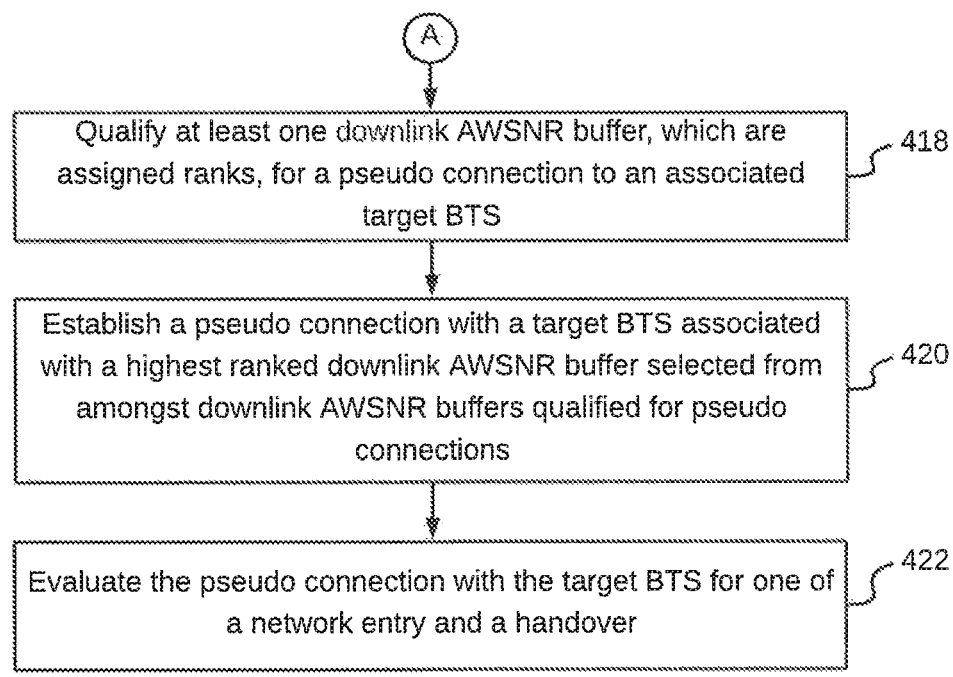

Referring now to FIGS. 4A and 4B, a flowchart of a method of managing network entry and handover of a CPE in a land-to-sea wireless network is illustrated, in accordance with another embodiment. At step 402, a plurality of configuration parameters are stored in the CPE. The CPE may include a flash chip for storing the plurality of configuration parameters. In an embodiment, the plurality of configuration parameters may be stored in each BTS in the land-to-sea wireless network. Whenever the CPE is power cycled or rebooted, the initialization function will read these configuration parameters into the main memory (for example, Random Access Memory (RAM)).

The plurality of configuration parameters may include, but are not limited to SNR threshold for weight assignment, i.e., S; SNR weight above the threshold, i.e., W1; SNR weight below (or equal to) the threshold, i.e., W2; AWSNR threshold for network entry or handover, i.e., E; confidence percentage on AWSNR samples, i.e., P; and distance threshold for Service Level Agreement (SLA), i.e., L1. For downlink SNR scan and ranking of BTSs, the plurality of configuration parameters may include, but are not limited to periodic BTS frequency scan interval, i.e., $T_s$ seconds; CPE dwell time on each antenna array, i.e., $T_a$ millisecond; CPE dwell time on each BTS frequency, i.e., $T_f$ millisecond; and confidence score threshold, i.e., CT. For network entry and handover thresholds, the plurality of configurations parameters may include, but are not limited to MCS throughput threshold for data-path enable, i.e., L2; confidence percentage for data-path enable, i.e., P2, minimum SLA requirement threshold, i.e., L3; confidence percentage threshold on minimum SLA requirement, i.e., P3; AWSNR threshold for handover hysteresis, i.e., HT; confidence percentage on AWSNR handover hysteresis, i.e., H; throughput threshold handover hysteresis, i.e., RT; and confidence percentage on throughput handover hysteresis, i.e., P4.

Thereafter, at step 404, a plurality of antenna arrays of the CPE collect the plurality of TDD messages for a plurality of BTS frequencies by scanning each of the plurality of BTS frequencies. Based on the plurality of TDD messages, a downlink SNR metric associated with each of the plurality of antenna arrays of the CPE for each of the plurality of BTS frequencies is computed at step 406. Downlink SNR metrics associated with the plurality of antenna arrays are then used to compute a downlink AWSNR metric for each of the plurality of BTS frequencies across each of the plurality of antenna arrays at step 408. This has been explained in detail in conjunction with FIG. 3.

At step 410, a distance between the CPE and each BTS associated with each of the plurality of BTS frequencies is computed. In order to compute distance between a BTS and the CPE, GPS coordinates, i.e., a GPS-BTS, of the BTS are made available in the broadcast TDD payload. CPEs hearing a broadcast TDD extract the GPS-BTS of the BTS. An onboard GPS device on CPE provides the current GPS coordinates of the CPE, i.e., GPS-CPE. Based on the GPS-BTS and GPS-CPE, the CPE computes a distance, i.e., d, of CPE from the BTS. The distance may be computed using the Haversine formula. It will be apparent to persons skilled in the art that any other methods may be used to compute the distance. Using the method above, the distance is computed between the CPE and each BTS associated with the plurality of BTS frequencies.

At step 412, a check is performed to determine whether the distance, i.e., d, between the CPE and each BTS is greater than a distance threshold. The distance threshold may be the distance threshold for SLA, i.e., L1, which may be a configurable threshold and the default value may be set to 25 miles. When 'd' for each BTS is greater than the distance threshold, the control goes back to the step 404. However, when 'd' for one or more BTSs is less than or equal to the distance threshold, the CPE performs step 414 for each of the one or more BTSs, for which the value of 'd' is less than or equal to the distance threshold. At the step 414, the CPE stores the downlink AWSNR metric computed for each of one or more BTS frequencies associated with the one or more BTSs across each of the plurality of antenna arrays in one or more downlink AWSNR buffers. This has already been explained in detail in conjunction with FIG. 3.

At step 416, ranks are assigned to each of the one or more downlink AWSNR buffers based on associated downlink AWSNR metrics. In other words, a BTS associated with a downlink AWSNR buffer is assigned a rank. The method used for ranking a downlink AWSNR buffer for network entry of the CPE is different from the method used to rank a downlink AWSNR buffer for a handover of the CPE from the serving BTS to a target BTS.

In an exemplary embodiment, for the network entry of the CPE, following configurations are assumed: the number (N) of antenna arrays in the CPE are four, i.e., AA-0, AA-1, AA-2, and AA-3, the size (M) of a circular buffer is 10, the number of BTS frequencies in scan table of the CPE is two, i.e., $f_1$ and $f_2$, and the confidence score threshold, i.e., CT is 0.5. Table 7 below depicts BTS frequency scan and ranking of downlink AWSNR buffers based on associated AWSNR metrics:

TABLE 7

| F, AA-x | AWSNR (Downlink) | | | | | | | | | | CS | Rank |
|---|---|---|---|---|---|---|---|---|---|---|---|---|
| $f_1$, AA-0 | 44 | 43 | 38 | 49 | 43 | 36 | 41 | 43 | 49 | 37 | | |
| $f_1$, AA-1 | 46 | 47 | 49 | 44 | 51 | 43 | 42 | 48 | 51 | 45 | 0.9 | 2 |
| $f_2$, AA-1 | 48 | 47 | 46 | 45 | 41 | 44 | 51 | 47 | 50 | 48 | | |
| $f_2$, AA-2 | 60 | 62 | 61 | 59 | 57 | 56 | 57 | 60 | 61 | 60 | | |
| $f_2$, AA-3 | 69 | 63 | 57 | 64 | 62 | 60 | 56 | 61 | 62 | 62 | 0.8 | 1 |

In the table 7, the first column depicts the index for an AWSNR buffer. By way of an example, ($f_1$, AA-0) depicts that downlink AWSNR metrics stored in the indexed downlink AWSNR buffer are computed for BTS frequency $f_1$ on the antenna array, AA-0. Based on the downlink AWSNR metrics, ($f_2$, AA-3) is identified to be the strongest downlink AWSNR buffer with a confidence score of 0.8, which is greater than the value of CT, i.e., 0.5. Accordingly, the downlink AWSNR buffer is assigned a rank 1. Once a downlink AWSNR buffer has been assigned the highest rank, all remaining downlink AWSNR buffers that have been indexed by the same BTS frequency are excluded. Thus, each downlink AWSNR buffer indexed with the BTS frequency $f_2$ are excluded. As a result, the following downlink AWSNR buffers are excluded: ($f_2$, AA-1),($f_2$, AA-2) and ($f_2$, AA-3). After excluding these downlink AWSNR buffers, the downlink AWSNR buffer: ($f_1$, 1) is the second strongest downlink AWSNR buffer with a confidence score of 0.9, which is greater than the value of CT, i.e., 0.5. The downlink AWSNR buffer ($f_1$, AA-1) is thus assigned a rank 2. Thereafter, the downlink AWSNR buffer ($f_1$, AA-0) and ($f_1$, AA-1) are excluded. As no more unique BTS frequencies are left, the ranking procedure stops.

For a handover of the CPE, in an exemplary embodiment, following configurations are assumed: the number (N) of antenna arrays in the CPE are four, i.e., AA-0, AA-1, AA-2, and AA-3, the size (M) of a circular buffer is 10, the number of BTS frequencies in scant table of the CPE is three, i.e., $f_1$, $f_2$, and $f_3$, the confidence score threshold, i.e., CT is 0.5, AWSNR threshold for handover hysteresis, i.e., HT is 10 dB, and confidence percentage on AWSNR handover hysteresis, i.e., H is 60%. Table 8 given below BTS frequency scan and ranking of downlink AWSNR buffers based on associated AWSNR metrics for handover. Table 9 depicts AWSNR hysteresis enforcement for the handover procedure.

TABLE 8

| F, AA-x | AWSNR (Downlink) | | | | | | | | | | CS | Rank |
|---|---|---|---|---|---|---|---|---|---|---|---|---|
| $f_1$, AA-0 | 44 | 43 | 38 | 49 | 43 | 36 | 41 | 43 | 49 | 37 | | |
| $f_1$, AA-1 | 66 | 67 | 69 | 64 | 61 | 63 | 62 | 58 | 61 | 65 | 1.0 | 1 |
| $f_2$, AA-2 | 40 | 43 | 41 | 49 | 53 | 36 | 37 | 41 | 43 | 40 | 0.5 | 3 |
| $f_3$, AA-0 | 49 | 43 | 47 | 44 | 42 | 40 | 46 | 39 | 43 | 42 | 0.7 | 2 |
| $f_3$, AA-3 | 38 | 36 | 41 | 40 | 33 | 31 | 37 | 37 | 36 | 37 | | |

In the table 8 above, the downlink AWSNR buffer, indexed by ($f_1$, AA-1) is identified to be the strongest AWSNR buffer with a confidence score of 1.0, which is greater than the value of CT, i.e., 0.5. The downlink AWSNR buffer ($f_1$, AA-1) is assigned a rank of 1. Thereafter, all downlink AWSNR buffers that are indexed by the BTS frequency $f_1$ are excluded from the ranking procedure. As a result, the following downlink AWSNR buffers are excluded: ($f_1$, AA-0) and ($f_1$, AA-1). This results in ($f_3$, AA-0) as the second strongest downlink AWSNR buffer with a confidence score of 0.7, which is greater than the value of CT, i.e., 0.5. The downlink AWSNR buffer ($f_3$, AA-0) is thus assigned a rank of 2. Thereafter, all downlink AWSNR buffers indexed by the BTS frequency $f_3$ are excluded from the next ranking procedure. Thus, the only BTS frequency left in the table 8 is $f_2$. There is only one downlink AWSNR buffer indexed by $f_2$, i.e., ($f_2$, AA-2). This downlink AWSNR buffer has a confidence score of 0.5, which is equal to the value of CT, i.e., 0.5, and ranked 3. Since there are no more BTS frequencies left to rank, the ranking procedure stops. Table 9 given below shows these three ranked downlink AWSNR buffers.

TABLE 9

| F, AA-x | AWSNR (Downlink) | | | | | | | | | | CP | Rank |
|---|---|---|---|---|---|---|---|---|---|---|---|---|
| $f_1$, AA-1 | 66 | 67 | 69 | 64 | 61 | 63 | 62 | 58 | 61 | 65 | 100% | 1 |
| $f_3$, AA-0 | 49 | 43 | 47 | 44 | 42 | 40 | 46 | 39 | 43 | 42 | | |
| $f_2$, AA-2 | 40 | 43 | 41 | 49 | 53 | 36 | 37 | 41 | 43 | 40 | 10% | |

In table 9, AWSNR hysteresis enforcement on downlink AWSNR buffers for handover is depicted. To this end, every downlink AWSNR metric in a target downlink AWSNR buffer is checked for handover hysteresis logic. In other words, the following check is performed: (a downlink AWSNR metric of a target downlink AWSNR buffer>a corresponding downlink AWSNR metric of the serving downlink AWSNR buffer+HT). Based on this check, in the target downlink AWSNR buffer ($f_1$, AA-1), 100% samples are greater than serving downlink AWSNR buffer ($f_3$, AA-0) by the value of HT, i.e., 10 dB. This percentage is greater than the confidence percentage on AWSNR handover hysteresis (H), i.e., 60%. The target downlink AWSNR buffer ($f_1$, AA-1) is thus retained as a potential target BTS frequency. However, in the target downlink AWSNR buffer ($f_2$, AA-2), only 10% samples are greater than the serving downlink AWSNR buffer ($f_3$, AA-0) by the value of HT, i.e., 10 dB. This percentage is less than the value of H, i.e., 50%. As a result, the target downlink AWSNR buffer ($f_2$, AA-2) is dropped from the potential target BTS frequency list.

Once ranks are assigned to the one or more downlink AWSNR buffers, one or more downlink AWSNR buffers that have been assigned ranks are qualified for a pseudo-connection to an associated target BTS at step 418. At least one downlink AWSNR buffer needs to pass this qualification in order to move to next step for network entry or handover. If none of the downlink AWSNR buffers, which have been assigned a rank, pass this qualification, the control may go back to the step 404. The one or more downlink AWSNR buffers that have been assigned ranks are subject to a rigorous pseudo-connection qualification to a potential BTS. This is essential to avoid any pre-mature downlink link qualification that may lead into frequent connection drops and/or situations unable to sustain SLA and handover to Very Small Aperture Terminal (VSAT) and vice versa ("network flapping") under unfavorable Radio Frequency (RF) channel conditions.

In order to qualify the one or more downlink AWSNR buffers (which have been assigned ranks) for the pseudo-connection, the downlink AWSNR metric of each of these one or more downlink AWSNR buffers is compared with an AWSNR threshold and a confidence percentage. In continuation of the exemplary embodiments given above, the following configurations are assumed: AWSNR threshold for network entry of handover, i.e., E is 24 dB and confidence percentage on downlink AWSNR samples, i.e., P, is 50%.

Referring back to table 7, for the network entry scenario, each of the ranked downlink AWSNR buffers, i.e., ($f_2$, AA-3) and ($f_1$, AA-1) are run through the pseudo-connection qualification process. To this end, each downlink AWSNR metric in the ranked downlink AWSNR buffers is compared against the value of E, i.e., 24 db. 100% of AWSNR metrics in the ranked downlink AWSNR buffers are greater than the value of E and this percentage is greater than the value of P, i.e., 50%.

Referring back to table 9, for the handover scenario, only the downlink AWSNR buffer ($f_1$, AA-1) is assigned a rank and is thus run through the pseudo-connection qualification discussed above. Since 100% of downlink AWSNR metrics in the downlink AWSNR buffer ($f_1$, AA-1) are greater than the value of E, i.e., 24 db and this percentage is greater than the value of P, i.e., 50%, ($f_1$, AA-1) passes the qualification. The downlink AWSNR buffer for the serving BTS, i.e., ($f_3$, AA-0), is excluded from this qualification.

Thereafter, at step 420, a pseudo-connection is established with a target BTS associated with a highest ranked downlink AWSNR buffer selected from amongst downlink AWSNR buffers qualified for pseudo-connections. In an embodiment, before establishing the pseudo-connection, for the network entry scenario, a BTS associated with one of the plurality of BTS frequencies is selected as the target BTS. The target BTS is selected based on comparison of downlink throughput predicted for the CPE with a threshold downlink throughput. In an exemplary embodiment, if a BTS is serving N CPEs using variable time slot TDMA (VS-TDMA) protocol, predicted downlink throughput for a CPE, which wants to make a network entry or handover, and is at a distance 'di' from the BTS may be computed using equation 6 below:

$$Ci = r(di)Ti/\Sigma Tj \text{ with } Tj \leq T \forall j\varepsilon \{1,2,\ldots,N+1\} \quad (6)$$

where,
Y=f(x) is the rate (y) vs. range (x) non-linear function,
Tj is the time slot duration allotted for CPEj by BTS,
T is the maximum value of this time slot, i.e., 10 ms.

Downlink utilization may be computed using equation 7 given below:

$$U = \Sigma Tj \forall j\varepsilon \{1,2,\ldots,N\} \quad (7)$$

Downlink throughput may be computed using equation 8 and 9 given below:

$$Ci = r(di)/(1+U/Ti) \quad (8)$$

$$r(di)/(N+1) \leq Ci \leq r(di) \quad (9)$$

If all CPEs use the complete time slot T (full load), U=NT and Ci=r(di)/(N+1). If none of the other CPEs are actively utilizing the bandwidth, U=0 and Ci=r(di). In other words, Ci is bounded as given in equation 9. For the network entry scenario, when BTSi is serving Ni CPEs and an unconnected CPE at a distance di from BTSi may selects BTSi as the candidate if equation 10 given below is satisfied:

$$Ci = \max Cj \forall j \quad (10)$$

In another embodiment, for a handover scenario, a BTS associated with one of the plurality of BTS frequencies is selected as a target BTS for handover, based on comparison of a downlink throughput predicted for the CPE with the threshold downlink throughput and a throughput handover hysteresis threshold. In an exemplary embodiment, for the handover scenario, CPE connected to a BTS with a downlink throughput of C and at a distance di from BTSi will select BTSi as the target BTS for handover, when equation 11 given below is satisfied:

$$Ci = \max Cj \forall j \text{ and } Ci - C > \Delta > 0 \quad (11)$$

where,
$\Delta$ is the throughput handover hysteresis threshold, i.e., RT.

Once the pseudo-connection is established with the target BTS, at step 422, the pseudo-connection with the target BTS is evaluated for one of a network entry and a handover. This has been explained in detail in conjunction with FIG. 3.

Figure 5:
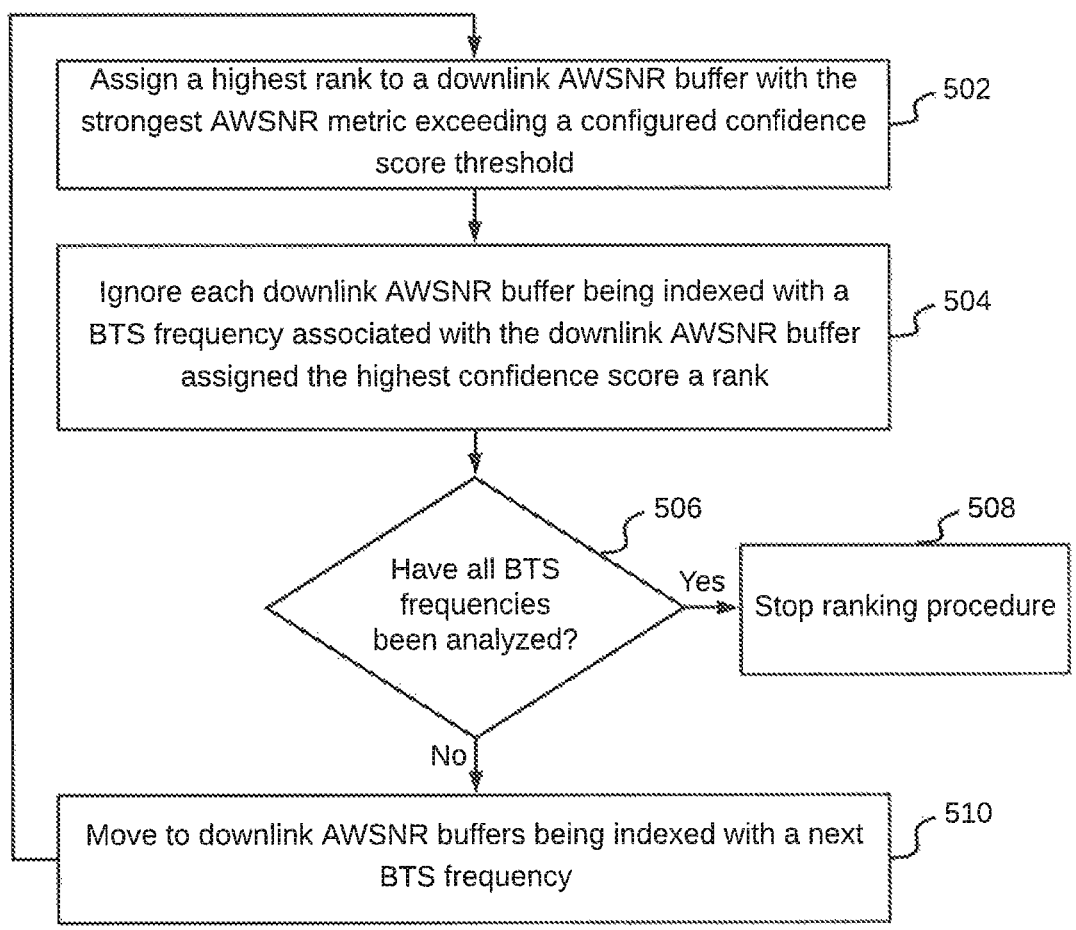
FIG. 5 illustrates a flowchart of a method for assigning ranks to downlink Aggregated Weighted Signal to Noise Ratio (AWSNR) buffers for network entry of a CPE, in accordance with an embodiment.

Referring now to FIG. 5, a flowchart of a method for assigning ranks to downlink AWSNR buffers for network entry of a CPE is illustrated, in accordance with an embodiment. At step 502, a highest rank is assigned to a downlink AWSNR buffer that has a highest confidence score. Thereafter, each downlink AWSNR buffer that is indexed with a BTS frequency associated with the downlink AWSNR buffer assigned the highest confidence score, is ignored at step 504. This has already been explained in detail in conjunction with the exemplary embodiment described in FIGS. 4A and 4B.

At step 506, a check is performed to determine whether all BTS frequencies have been analyzed. In other words, it is checked whether all downlink AWSNR buffers indexed different BTS frequencies have been evaluated for rank assignment or not. In case all BTS frequencies have been analyzed, at step 508, the ranking procedure is stopped. However, if all BTS frequencies have not been analyzed, at step 510, the ranking procedure moves to downlink AWSNR buffers that are indexed with a next BTS frequency. Thereafter, the control proceeds to step 502, thus, steps 502 and 504 are performed for downlink AWSNR buffers indexed by the next BTS frequency. This has already been explained in detail in conjunction with the exemplary embodiment described in FIGS. 4A and 4B.

Figure 6:
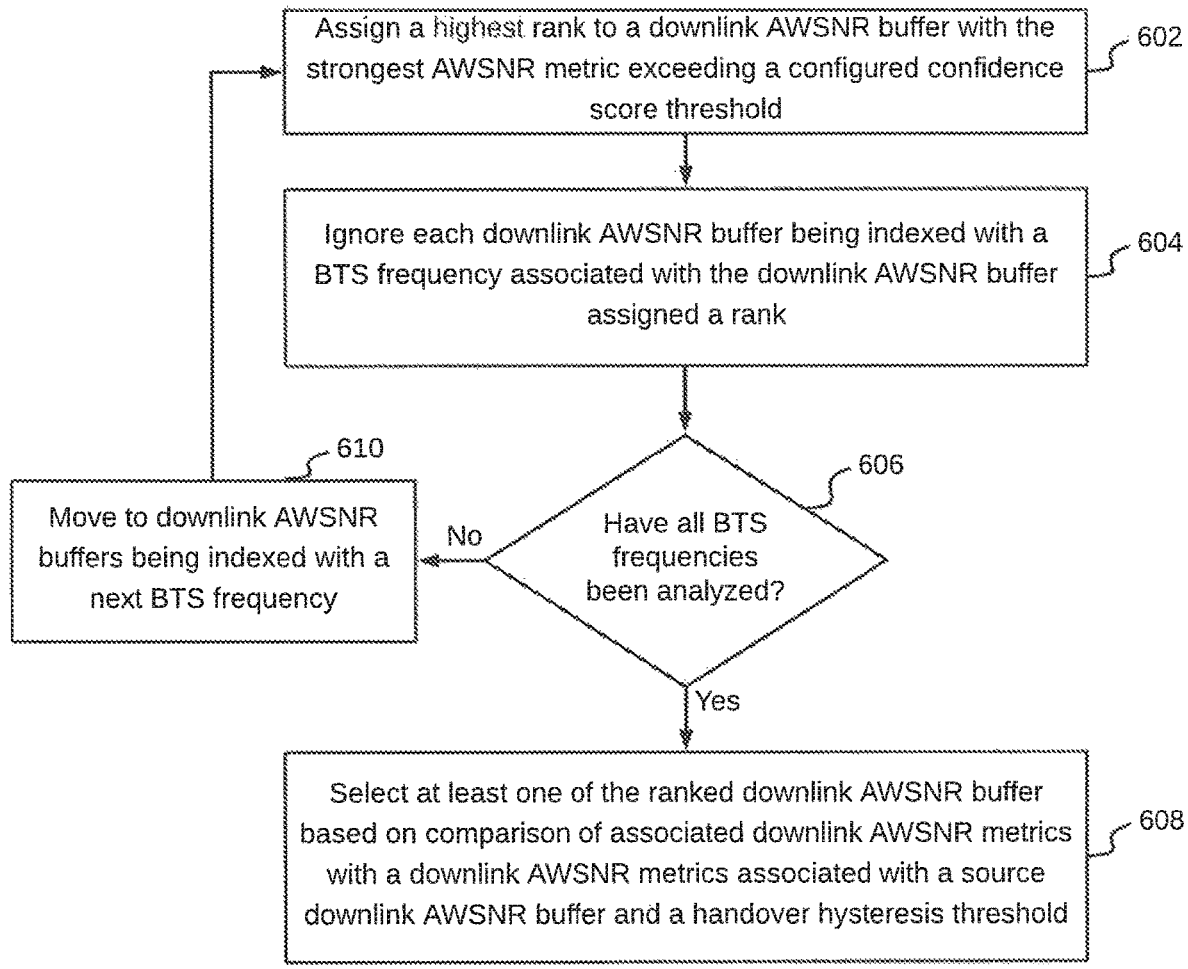
FIG. 6 illustrates a flowchart of a method for assigning ranks to downlink AWSNR buffers for handover of a CPE, in accordance with an embodiment.

Referring now to FIG. 6, a flowchart of a method for assigning ranks to downlink AWSNR buffers for handover of a CPE is illustrated, in accordance with an embodiment. At step 602, a highest rank is assigned to a downlink AWSNR buffer that has a highest confidence score. Thereafter, each downlink AWSNR buffer that is indexed with a BTS frequency associated with the downlink AWSNR buffer assigned the highest confidence score, is ignored at step 604. This has already been explained in detail in conjunction with the exemplary embodiment described in FIGS. 4A and 4B.

At step 606, a check is performed to determine whether all BTS frequencies have been analyzed. In other words, it is checked whether all downlink AWSNR buffers indexed different BTS frequencies have been evaluated for rank assignment or not. In case all BTS frequencies have been analyzed, at step 608, one or more of ranked downlink AWSNR buffers are selected based on comparison of associated downlink AWSNR metrics with a downlink AWSNR metrics associated with a serving downlink AWSNR buffer and a handover hysteresis threshold. This has already been explained in detail in conjunction with the exemplary embodiment described in FIGS. 4A and 4B.

However, if all BTS frequencies have not been analyzed, at step 610, the ranking procedure moves to downlink AWSNR buffers that are indexed with a next BTS frequency. Thereafter, the control proceeds to step 602, thus, steps 602 and 604 are performed for downlink AWSNR buffers indexed by the next BTS frequency. This has already been explained in detail in conjunction with the exemplary embodiment described in FIGS. 4A and 4B.

Figure 7:
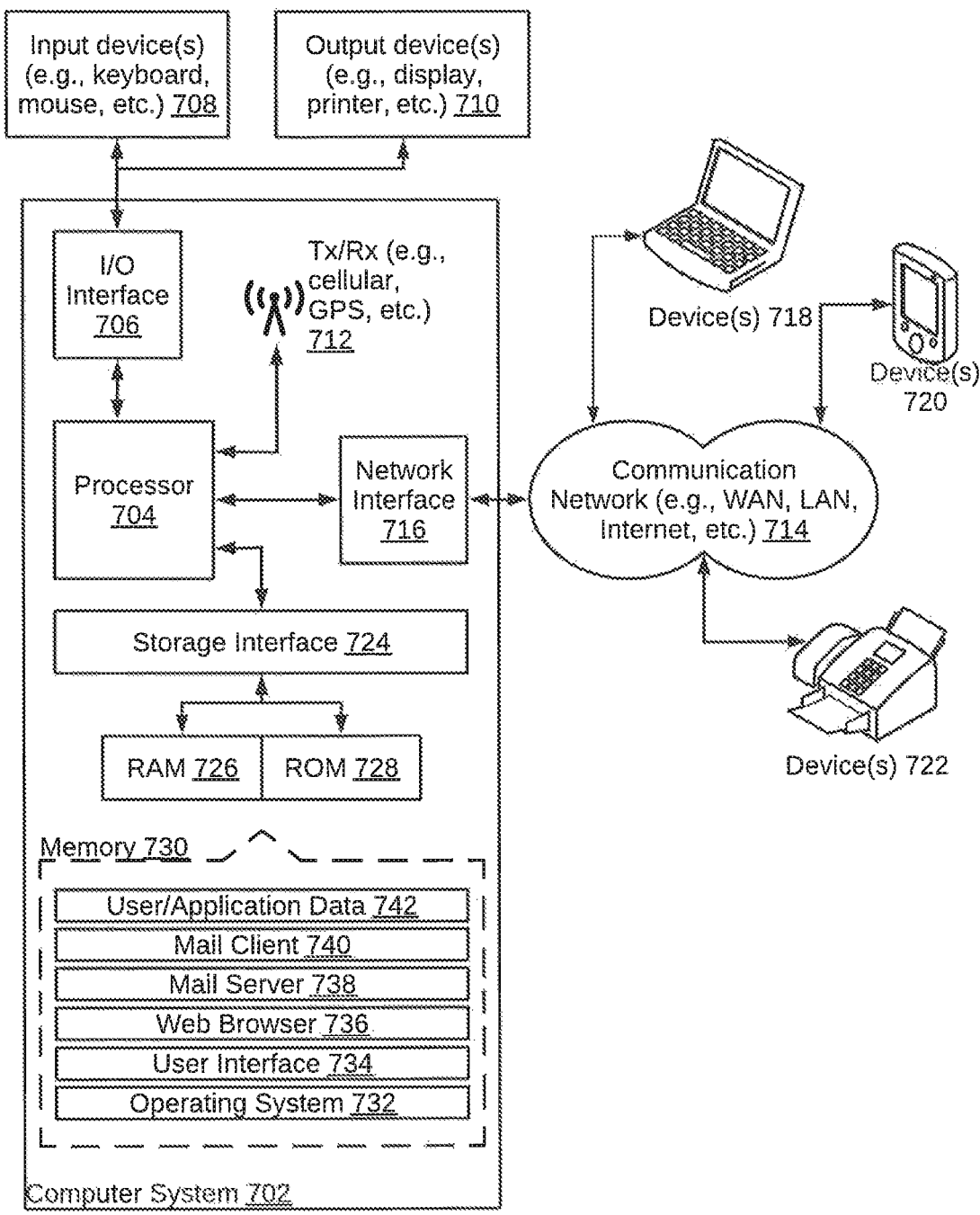
FIG. 7 illustrates a block diagram of an exemplary computer system for implementing various embodiments.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® (PHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IGS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method, system, and device for managing network entry and BTS handover in land-to-sea wireless networks. The provided method jointly uses uplink and downlink metrics for a robust network entry or handover for the CPE, where channel quality on either communication end points is factored in the decisions. It minimizes network ping-pong effect through a stringent qualification of link in both network entry or handover. In order to screen efforts on network entry or handover, static distance based threshold is also used. Two approaches, i.e., a SNR based and an MCS throughput based approach, are used for network entry or handover through a pseudo-connected mode. Moreover, CPE throughput is optimized through a load-balancing mechanism that uses BTS utilization metric. Since the solution is based on metrics, such as, MCS and SNR, it can be ported to many different similar communication systems that provide a facility to fetch SNR or MCS from the hardware unit from a user application.

Thorough evaluation of CPE uplink and downlink interference together with CPE load-balancing based on BTS utilization before making a network entry or handover ensures that SLA is guaranteed, throughput (QoS) is maximized, QoE is improved by minimizing connection termination on land-to-sea wireless networks and ping-pong (toggling) between land-to-sea wireless networks and satellite networks.

The specification described provide method, system, and device for managing network entry and BTS handover in land-to-sea wireless networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing network entry and handover in a land-to-sea wireless network, the method comprising:
computing, by a Customer Premises Equipment (CPE), a downlink Signal-to-Noise Ratio (SNR) metric associated with each of a plurality of antenna arrays of the CPE for each of a plurality of Base Transceiver Station (BTS) frequencies associated with a corresponding BTS from a plurality of BTSs, based on a plurality of Time Division Duplex (TDD) messages collected for the plurality of BTS frequencies computing, by the CPE, a downlink Aggregated Weighted SNR (AWSNR) metric for each of the plurality of BTS frequencies across each of the plurality of antenna arrays based on downlink SNR metrics associated with the plurality of antenna arrays;

storing, by the CPE, the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array;

assigning ranks, by the CPE, to at least one downlink AWSNR buffer from the plurality of downlink AWSNR buffers based on associated downlink AWSNR metrics;

establishing, by the CPE, a pseudo-connection with a target BTS associated with a highest ranked downlink AWSNR buffer of the plurality of downlink AWSNR buffers, wherein the pseudo-connection is established when at least one of the ranked downlink AWSNR buffers from the plurality of downlink AWSNR buffers passes a pre-defined pseudo-connection qualification criterion, and wherein the pseudo-connection corresponds to a connection in which an uplink and a downlink data-path is disabled between the target BTS and the CPE; and evaluating, by the CPE, the pseudo-connection with the target BTS for one of a network entry and a handover, based on at least one of uplink AWSNR metrics associated with the target BTS or Module and Coding Scheme (MCS) metrics associated with the CPE and the target BTS.

2. The method of claim 1 further comprising collecting, by the plurality of antenna arrays, the plurality of TDD messages for the plurality of BTS frequencies by scanning each of the plurality of BTS frequencies.

3. The method of claim 1 further comprising storing a plurality of configuration parameters in at least one of the CPE and at least one of the plurality of BTSs.

4. The method of claim 1, wherein the ranking comprises computing a confidence score for each of the plurality of downlink AWSNR buffers.

5. The method of claim 4, wherein for the network entry of the CPE, assigning the ranks comprises:

assigning a highest rank to a downlink AWSNR buffer with the strongest AWSNR metric exceeding a configured confidence score threshold;

ignoring each downlink AWSNR buffer being indexed with a BTS frequency associated with the downlink AWSNR buffer assigned a rank; and repeating the above steps for each of the remaining plurality of downlink AWSNR buffers.

6. The method of claim 4, wherein for the handover of the CPE, assigning the ranks comprises:

assigning a highest rank to a downlink AWSNR buffer with the strongest AWSNR metric exceeding a configured confidence score threshold;

ignoring each downlink AWSNR buffer being indexed with a BTS frequency associated with the downlink AWSNR buffer assigned a rank;

repeating the above steps for each of the remaining plurality of downlink AWSNR buffers; and selecting at least one downlink AWSNR buffer from the ranked downlink AWSNR buffers based on a comparison of associated downlink AWSNR metrics with downlink AWSNR metrics associated with a serving downlink AWSNR buffer and a handover hysteresis threshold.

7. The method of claim 1 further comprising computing, by the CPE, a distance between the CPE and each BTS from the plurality of BTSs, associated with a corresponding BTS frequency from the plurality of BTS frequencies.

8. The method of claim 1 further comprising:

selecting a BTS associated with one of the plurality of BTS frequencies as the target BTS for the network entry, based on comparison of a downlink throughput predicted for the CPE with a threshold downlink throughput; and selecting a BTS associated with one of the plurality of BTS frequencies as the target BTS for the handover, based on comparison of the downlink throughput predicted for the CPE with the threshold downlink throughput and a throughput handover hysteresis threshold.

9. The method of claim 1 further comprising qualifying, by the CPE, at least one downlink AWSNR buffer for a pseudo-connection to an associated target BTS, wherein the highest ranked downlink AWSNR buffer is selected from amongst downlink AWSNR buffers qualified for pseudo-connections.

10. The method of claim 9, wherein qualifying the at least one downlink AWSNR buffer for the pseudo-connection comprises comparing the downlink AWSNR metrics of each of the at least one downlink AWSNR buffer with an AWSNR threshold and a confidence percentage.

11. A Customer Premises Equipment (CPE) for managing network entry and handover in a land-to-sea wireless network, the CPE comprising:

a processor coupled to a plurality of antenna arrays; and a memory communicatively coupled to the processor and the plurality of antenna arrays, wherein the memory stores instructions, which on execution cause the processor to:

compute a downlink Signal-to-Noise Ratio (SNR) metric associated with each of the plurality of antenna arrays of the CPE for each of a plurality of Base Transceiver Station (BTS) frequencies associated with a corresponding BTS from a plurality of BTSs, based on a plurality of Time Division Duplex (TDD) messages collected for the plurality of BTS frequencies;

compute a downlink Aggregated Weighted SNR (AWSNR) metric for each of the plurality of BTS frequencies across each of the plurality of antenna arrays based on downlink SNR metrics associated with the plurality of antenna arrays;

store the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array;

assign ranks to at least one downlink AWSNR buffer from the plurality of downlink AWSNR buffers based on associated downlink AWSNR metrics;

establish a pseudo-connection with a target BTS associated with a highest ranked downlink AWSNR buffer of the plurality of downlink AWSNR buffers, wherein the pseudo-connection is established when at least one of the ranked downlink AWSNR buffers from the plurality of downlink AWSNR buffers passes a pre-defined pseudo-connection qualification criterion, and
wherein the pseudo-connection corresponds to a connection in which an uplink and a downlink data-path is disabled between the target BTS and the CPE; and
evaluate the pseudo-connection with the target BTS for one of a network entry and a handover, based on at least one of uplink AWSNR metrics associated with the target BTS or Module and Coding Scheme (MCS) metrics associated with the CPE and the target BTS.

12. The CPE of claim 11, wherein the processor instructions further cause the processor to collect, via the plurality of antenna arrays, the plurality of TDD messages for the plurality of BTS frequencies by scanning each of the plurality of BTS frequencies.

13. The CPE of claim 11, wherein the processor instructions further cause the processor to store a plurality of configuration parameters in at least one of the CPE and at least one of a plurality of BTSs.

14. The CPE of claim 11, wherein the ranking comprises computing a confidence score for each of the plurality of downlink AWSNR buffers.

15. The CPE of claim 14, wherein for the network entry of the CPE, to assign the ranks, the processor instructions further cause the processor to:
assign a highest rank to a downlink AWSNR buffer with the strongest AWSNR metric exceeding a configured confidence score threshold;
ignore each downlink AWSNR buffer being indexed with a BTS frequency associated with the downlink AWSNR buffer assigned a rank; and
repeat the above steps for each of the remaining plurality of downlink AWSNR buffers.

16. The CPE of claim 14, wherein for the handover of the CPE, to assign the ranks, the processor instructions further cause the processor to:
assign a highest rank to a downlink AWSNR buffer with the strongest AWSNR metric exceeding a configured confidence score threshold;
ignore each downlink AWSNR buffer being indexed with a BTS frequency associated with the downlink AWSNR buffer assigned a rank;
repeat the above steps for each of the remaining plurality of downlink AWSNR buffers; and
select at least one downlink AWSNR buffer from ranked downlink AWSNR buffer based on a comparison of associated downlink AWSNR metrics with downlink AWSNR metrics associated with a serving downlink AWSNR buffer and a handover hysteresis threshold.

17. The CPE of claim 11, wherein the processor instructions further cause the processor to compute a distance between the CPE and each BTS from the plurality of BTSs, associated with a corresponding BTS frequency from each of the plurality of BTS frequencies.

18. The CPE of claim 11, wherein the processor instructions further cause the processor to:
select a BTS associated with one of the plurality of BTS frequencies as the target BTS for the network entry, based on comparison of a downlink throughput predicted for the CPE with a threshold downlink throughput; and
select a BTS associated with one of the plurality of BTS frequencies as the target BTS for the handover, based on comparison of the downlink throughput predicted for the CPE with the threshold downlink throughput and a throughput handover hysteresis threshold.

19. The CPE of claim 11, wherein the processor instructions further cause the processor to qualify at least one downlink AWSNR buffer for a pseudo-connection to an associated target BTS, wherein the highest ranked downlink AWSNR buffer is selected from amongst downlink AWSNR buffers qualified for pseudo-connections.

20. The CPE of claim 19, wherein to qualify the at least one downlink AWSNR buffer for the pseudo-connection, the processor instructions further cause the processor to compare the downlink AWSNR metrics of each of the at least one downlink AWSNR buffer with an AWSNR threshold and a confidence percentage.

21. A system for managing network entry and handover in a land-to-sea wireless network, the system comprising:
a plurality of Base Transceiver Stations (BTSs);
a Customer Premises Equipment (CPE) configured to communicate with at least one of the plurality of BTSs, wherein the CPE is further configured to:
compute a downlink Signal-to-Noise Ratio (SNR) metric associated with each of the plurality of antenna arrays of the CPE for each of a plurality of BTS frequencies associated with the plurality of BTSs associated with a corresponding BTS from the plurality of BTSs, based on a plurality of Time Division Duplex (TDD) messages collected for the plurality of BTS frequencies;
compute a downlink Aggregated Weighted SNR (AWSNR) metric for each of the plurality of BTS frequencies across each of the plurality of antenna arrays based on downlink SNR metrics associated with the plurality of antenna arrays;
store the downlink AWSNR metric computed for each of the plurality of BTS frequencies across each of the plurality of antenna arrays in a plurality of downlink AWSNR buffers, wherein each of the plurality of downlink AWSNR buffers is indexed by an associated BTS frequency and an associated antenna array;
assign ranks to at least one downlink AWSNR buffer from the plurality of downlink AWSNR buffers based on associated downlink AWSNR metrics;
establish a pseudo-connection with a target BTS associated with a highest ranked downlink AWSNR buffer of the plurality of downlink AWSNR buffers, wherein the pseudo-connection is established when at least one of the ranked downlink AWSNR buffers from the plurality of downlink AWSNR buffers passes a pre-defined pseudo-connection qualification criterion, and
wherein the pseudo-connection corresponds to a connection in which an uplink and a downlink data-path is disabled between the target BTS and the CPE; and
evaluate the pseudo-connection with the target BTS for one of a network entry and a handover, based on at least one of uplink AWSNR metrics associated with the target BTS or Module and Coding Scheme (MCS) metrics associated with the CPE and the target BTS.

* * * * *